Nov. 5, 1935. R. I. McLELLAN 2,019,922
COMBINATION HEATING AND IRRIGATING SYSTEM
Filed Jan. 8, 1934
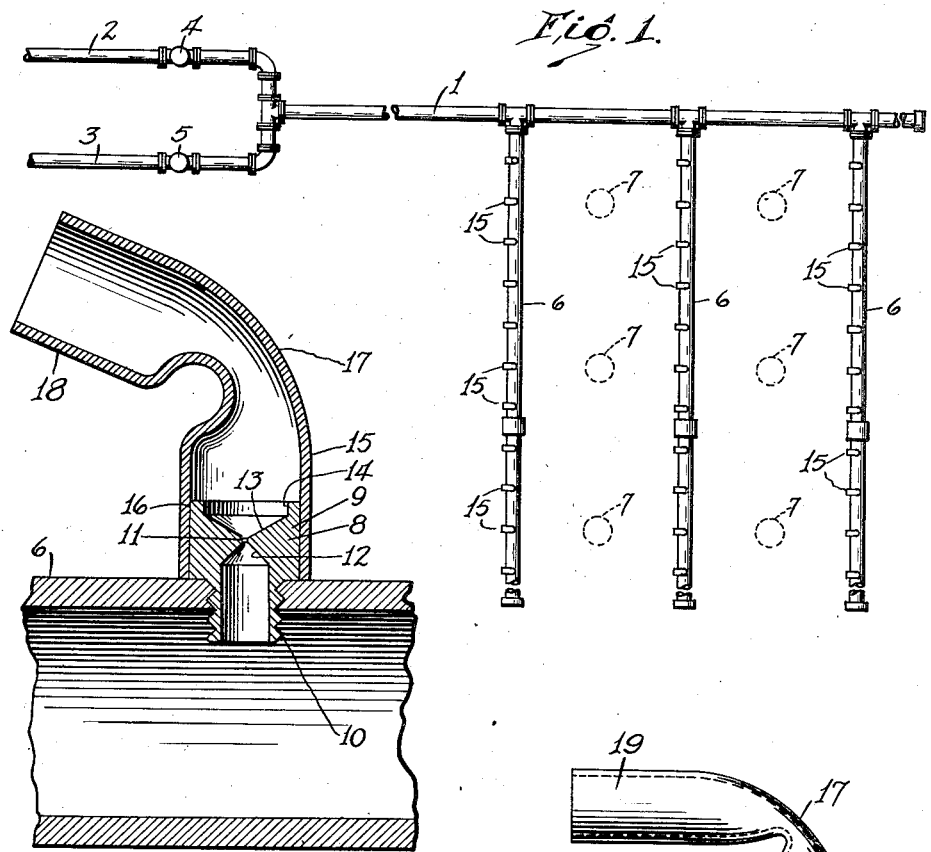
Fig. 1.
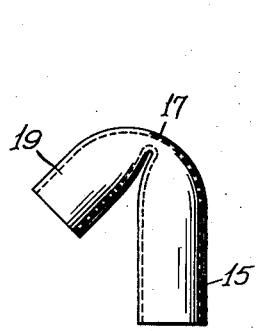
Fig. 2.
Fig. 3.
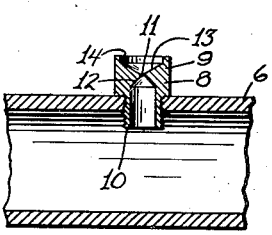
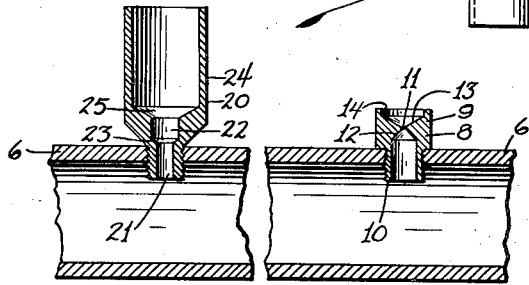
Fig. 6. Fig. 5.
Fig. 4.
INVENTOR.
RODERICK I. M<sup>c</sup>LELLAN
BY
Munn, Anderson, Stanley, Foster & Liddy
ATTORNEYS.

Patented Nov. 5, 1935

2,019,922

UNITED STATES PATENT OFFICE 2,019,922

COMBINATION HEATING AND IRRIGATING SYSTEM

Roderick I. McLellan, Burlingame, Calif.

Application January 8, 1934, Serial No. 705,812

2 Claims. (Cl. 158—99)

The present invention relates to improvements in a combination heating and irrigating system for an orchard and its principal object is to provide a simple and economical means for heating an orchard that may also be used as a means for irrigating or spraying the orchard.

More particularly it is proposed in the present invention to provide a heating system for an orchard in which gas is employed as the heating medium.

At the present time the most popular means for heating orchards on cold winter mornings is the well known smudge pot which employs oil, and which has the disadvantage of spreading a cloud of smoke over the orchard.

In the present invention it is proposed to provide a means for utilizing gas, either manufactured gas or natural gas, preferably the latter where obtainable which is economical, may be quickly ignited and does not form any smoke which is so obnoxious, particularly in regions where many square miles of acreage are devoted to orchards requiring heating in winter time, as for instance in southern California.

It is a further object of the present invention to provide in a heating system of the character described a burner that is exceedingly simple, and that as a matter of fact comprises nothing but an orifice and a short piece of pipe bent to form an elbow.

One of the important features of my invention is the discovery that for orchard heating by means of gas it is not necessary to provide means for mixing the gas with air prior to ignition but that the gas may be burned in the form of a white flame which for the purposes of orchard heating is as effective as the blue flame resulting from the use of a gas and air mixture.

This discovery very much simplifies the burner required for my purposes and makes the use of gas for general orchard heating economically possible.

It is further possible in my system to combine an orchard heating means with an orchard spraying means since the same pipe line and the same orifice that is used for the dispensing of the gas may also be used for the dispensing of water, it being only necessary to apply or remove the burners for rendering the system available for heating or spraying respectively.

Further objects and advantages of my invention will appear as the specification proceeds.

The preferred form of my invention is illustrated in the accompanying drawing, in which Figure 1 shows a plan view illustrating my combination spraying and heating system;

Figure 2 a vertical section through one of my burner arrangement as applied to a pipe line;

Figure 3 a slightly modified form of burner; and

Figure 4 a still further modified form of burner;

Figure 5 a vertical section, on reduced scale, of the arrangement of Figure 2, with the burner omitted and adapted to be used as a spraying system; and Figure 6 a vertical section similar to that of Figure 5 but showing a slightly modified orifice.

While I have shown only the preferred form of my invention I wish to have it understood that various changes or modifications may be made within the scope of the claims hereto attached without departing from the spirit of the invention.

In its preferred form my invention comprises a main pipe 1 connecting at its receiving ends with a water supply pipe 2 and a gas supply pipe 3, both of which latter pipes are controlled by valves 4 and 5 respectively so that the main pipe 1 may be operatively connected to either of the two supply pipes. The main pipe 1 preferably has a plurality of branch pipes 6 extending laterally therefrom, and these branch pipes extend between the rows of trees 7 of an onchard, the main pipe 1 being preferably arranged along one edge of the orchard. This arrangement of course may be changed to suit the requirements of whatever area of land is to be treated.

Each of the branch pipes 6 has a plurality of orifices or dispensing tips 8 disposed thereon, the orifices being preferably made in the form of short cylindrical sections 9 having threaded shanks 10 projecting therefrom, the shanks being adapted for threaded engagement with the pipes so that the cylindrical sections project from the upper surface thereof. The orifices are provided with small apertures 11, a tapered wall 12 leading to the aperture from the bottom and a tapered wall 13 spreading upwardly from the aperture, the latter tapered wall terminating in a short cylindrical section 14.

In connection with this orifice I use a short length of pipe 15 adapted to be telescoped on the cylindrical section of the orifice as shown at 16, with freedom of turning movement. This piece of pipe is bent intermediate its length as shown at 17 so as to provide a section of restricted cross area and to cause the upper end of the pipe to assume an angular position which may have a slight upward incline as at 18 in Figure 2, or a downward incline as at 19 in Figure 4, or which may be horizontal at right angles to the lower end as shown at 19 in Figure 3. It will be noted that these short pipe sections may be applied to the pipe lines very quickly, and may also be removed very quickly. No holes are provided in these short pipes for admission of air into the gas as it emanates from the orifice, and the main object of the short pipe sections is to cause the gas issuing from the orifice to be retarded in its flow and to issue from the discharge end of the pipe in a leisurely manner.

If the gas is ignited it will provide a white flame, and I have found by experiments that a white flame for my purposes is as efficient as a blue flame, and has the further advantage that the heat will rise very slowly and will be confined for a long time to the area of the trees instead of rapidly rising above the trees where it serves no useful purposes.

The bend in the pipe not only serves the purpose of guiding and decelerating the gas, but on account of its freedom of turning movement, it may be readily arranged in proper position relative to the prevailing wind so that the wind does not blow into the pipe and that water, rain or snow is prevented from entering the burner to clog or stop the flow of gas and heat.

If the system is to be used for a spraying system for irrigating the land it is merely necessary to remove the short pipe sections 15 as illustrated in Figure 5 and to hook up to the water pipe in which case water will be sprayed through the orifices and will be evenly distributed over the ground surface.

It stands to reason, of course, that where the system is to be used as a combined spraying and heating system, the pipes will be selected of somewhat larger dimensions than if it is used for a heating system only. If used for a heating system only, the installation may be made very inexpensive by the selection of small pipe and small orifice. If the system is to be used as a combination heating and irrigating system somewhat larger pipes should be selected, which will involve a larger expense, but which again will be superior to present methods because the larger expense serves two different purposes, each of which bears a part of the expense.

For gas any suitable supply may be used such as manufactured gas or natural gas furnished by a regular gas distributing system. Where no reglar system is available tank gas may be used. In case tank gas is used it may be necessary to provide means for preheating or carbureting the gas, since tank gas as used at the present time is liquid at 30° F. and the temperature in those orchards requiring heating frequently drops below 30°. However, once the gas has been changed into gaseous form, it may be used in my system in the same manner as gas furnished by a regular distributing system.

The igniting of the gas may be very simple since in many cases the burners may be placed sufficiently close so that the flame will spread from one burner to the next one in which case it is only required to light one burner on each pipe line which in itself would constitute a marked improvement since speed in the starting of the heating system very often is one of the principal prerequisites to success.

One of the principal advantages is the use of a slow, lazy flame within two inches from the earth surface which will cause the heat rising from the flame to remain in an effective area for a considerable length of time so that little heat escapes into the atmosphere above the trees.

A slightly different form of orifice is shown at 20 in Figure 6, in which form the tip includes a cylindrical passage 21 communicating with the pipe, a larger cylindrical passage 22 communicating with the former through a tapered section 23 and a still larger cylindrical section 24 connecting with the second section through a tapered portion 25. This tip is well adapted for the heating system but not for spraying.

While I have described my system particularly in connection with orchard heating and irrigating, it is obvious that it may be used with the same advantage under other conditions as in nurseries, lath houses, glass houses or other inclosures devoted to the raising of plants, flowers or vegetables of any kind.

Where overhead spraying or irrigating systems are used they may be easily converted into my heating system by lowering the same to the ground surface. An ordinary swing joint for swinging the pipe line between elevated and ground positions would serve the purpose.

I claim:

1. In combination, a gas carrying pipe, an outlet nozzle for the pipe, and a short pipe connected to the nozzle, said short pipe being bent intermediate its ends and having its passageway provided with a restriction at the bend, the portion of the short pipe above the bend being inclined to the vertical so that the free end thereof will be protected against the entrance of foreign matter.

2. In combination, a gas carrying pipe, an outlet nozzle for the pipe, and a short pipe connected to the nozzle, said short pipe being bent intermediate its ends and having its passageway provided with a restriction at the bend, the portion of the short pipe above the bend being inclined to the vertical so that the free end thereof will be protected against the entrance of foreign matter, said short pipe being revolvably mounted on the nozzle so as to be swingable and to point in a desired direction.

RODERICK I. McLELLAN.